United States Patent
Gupta

(10) Patent No.: US 9,919,966 B2
(45) Date of Patent: Mar. 20, 2018

(54) METHOD OF USING PHTHALIC AND TEREPHTHALIC ACIDS AND DERIVATIVES THEREOF IN WELL TREATMENT OPERATIONS

(71) Applicant: Baker Hughes, a GE company, LLC, Houston, TX (US)

(72) Inventor: D.V. Satyanarayana Gupta, The Woodlands, TX (US)

(73) Assignee: Baker Hughes, a GE company, LLC, Houston, TX (US)

( * ) Notice: Subject to any disclaimer, the term of this patent is extended or adjusted under 35 U.S.C. 154(b) by 0 days.

(21) Appl. No.: 13/928,006

(22) Filed: Jun. 26, 2013

(65) Prior Publication Data

US 2013/0341025 A1    Dec. 26, 2013

Related U.S. Application Data

(60) Provisional application No. 61/664,640, filed on Jun. 26, 2012.

(51) Int. Cl.
| | |
|---|---|
| *C09K 8/506* | (2006.01) |
| *C09K 8/516* | (2006.01) |
| *C09K 8/536* | (2006.01) |
| *E21B 33/138* | (2006.01) |
| *C04B 24/02* | (2006.01) |
| *E21B 21/00* | (2006.01) |

(52) U.S. Cl.
CPC ............. *C04B 24/02* (2013.01); *C09K 8/506* (2013.01); *C09K 8/516* (2013.01); *C09K 8/536* (2013.01); *E21B 21/003* (2013.01); *C09K 2208/18* (2013.01); *C09K 2208/32* (2013.01); *E21B 33/138* (2013.01)

(58) Field of Classification Search
CPC ... C09K 8/74; C09K 8/68; C09K 8/72; C09K 8/506; C09K 8/50; C09K 8/76; C09K 8/035; C09K 2208/18; E21B 33/138; E21B 43/26; E21B 43/261; E21B 33/13; E21B 43/04
See application file for complete search history.

(56) References Cited

U.S. PATENT DOCUMENTS

| | | | |
|---|---|---|---|
| 2,596,843 A | 5/1952 | Farris | |
| 2,735,269 A | 2/1956 | Carpenter et al. | |
| 2,966,457 A | 12/1960 | Starmann et al. | |
| 3,089,542 A | 5/1963 | Kolodny | |
| 3,127,937 A | 4/1964 | McGuire, Jr. et al. | |
| 3,149,673 A | 9/1964 | Pennington | |
| 3,149,674 A | 9/1964 | Schutze et al. | |
| 3,151,678 A | 10/1964 | Hanson et al. | |
| 3,159,217 A | 12/1964 | Hanson | |
| 3,175,615 A | 3/1965 | East | |
| 3,254,717 A | 6/1966 | Huitt et al. | |
| 3,266,573 A | 8/1966 | Rixe | |
| 3,335,796 A | 8/1967 | Parker, Jr. | |
| 3,335,797 A | 8/1967 | Braunlich, Jr. | |
| 3,372,752 A | 3/1968 | Prater | |
| 3,399,727 A | 9/1968 | Graham et al. | |
| 3,480,084 A | 11/1969 | Eilers | |

(Continued)

FOREIGN PATENT DOCUMENTS

| | | |
|---|---|---|
| CA | 2329834 A1 | 6/2002 |
| EP | 0308257 A2 | 3/1989 |

(Continued)

OTHER PUBLICATIONS

Chellappah "A new outlook on the idea I packing Theory for Bridging Solids" SPE 151636 Feb. 17, 2012.*
Kaageson-Loe et al. "Particulate-Based Loss-Prevention Material— The secrets of Fracture Sealing Revealed" SPE 112595 Dec. 2009.*
Frank F. Chang, Xiandong Qiu, Hisham A. Nasr-El-Din; "Chemical Diversion Techniques Used for Carbonate Matrix Acidizing: An Overview and Case Histories" 2007 SPE International Symposium on Oilfield Chemistry; SPE 106444; Feb. 28-Mar. 2, 2007; Houston, Texas.

(Continued)

*Primary Examiner* — William D Hutton, Jr.
*Assistant Examiner* — Charles R Nold
(74) *Attorney, Agent, or Firm* — John Wilson Jones; Jones Delflache LLP

(57) ABSTRACT

The flow of a fluid may be diverted from a high permeability zone to a low permeability portion of a subterranean formation by use of a diverter having the structural formula (I):

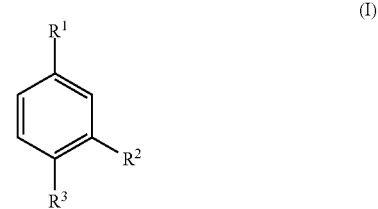

(I)

wherein:
  $R^1$ is —COO—$(R^5O)_y$—$R^4$;
  $R^2$ and $R^3$ are selected from the group consisting of —H and —COO—$(R^5O)_y$—$R^4$;
    provided that at least one of $R^2$ or $R^3$ is —COO—$(R^5O)_y$—$R^4$ and
    further provided that both $R^2$ and $R^3$ are not —COO—$(R^5O)_y$—$R^4$;
  $R^4$ is —H or a $C_1$-$C_6$ alkyl group;
  $R^5$ is a $C_1$-$C_6$ alkylene group; and
  each y is 0 to 5.
Anhydrides of formula (I) are also acceptable as the diverter.

16 Claims, No Drawings

(56) References Cited

U.S. PATENT DOCUMENTS

| | | |
|---|---|---|
| 3,492,147 A | 1/1970 | Young |
| 3,497,008 A | 2/1970 | Graham et al. |
| 3,659,651 A | 5/1972 | Graham |
| 3,709,300 A | 1/1973 | Pye |
| 3,888,311 A | 6/1975 | Cooke |
| 3,929,191 A | 12/1975 | Graham et al. |
| 3,937,283 A | 2/1976 | Blauer et al. |
| 3,954,142 A | 5/1976 | Broaddus |
| 4,051,900 A | 10/1977 | Hankins |
| 4,074,760 A | 2/1978 | Copeland et al. |
| 4,078,609 A | 3/1978 | Pavlich |
| 4,078,610 A | 3/1978 | Arnold |
| 4,195,010 A | 3/1980 | Russell et al. |
| 4,216,829 A | 8/1980 | Murphey |
| 4,421,167 A | 12/1983 | Erbstoesser et al. |
| 4,439,489 A | 3/1984 | Johnson et al. |
| 4,444,264 A | 4/1984 | Dill |
| 4,462,466 A | 7/1984 | Kachnik |
| 4,493,875 A | 1/1985 | Beck |
| 4,506,734 A | 3/1985 | Nolte |
| 4,509,598 A | 4/1985 | Earl et al. |
| 4,502,967 A | 5/1985 | Conway |
| 4,547,468 A | 10/1985 | Jones et al. |
| 4,585,064 A | 4/1986 | Graham et al. |
| 4,632,876 A | 12/1986 | Laird et al. |
| 4,654,266 A | 3/1987 | Kachnik |
| 4,680,230 A | 7/1987 | Gibb et al. |
| 4,717,594 A | 1/1988 | Graham et al. |
| 4,733,729 A | 3/1988 | Copeland |
| 4,796,701 A | 1/1989 | Hudson et al. |
| 4,829,100 A | 5/1989 | Murphey et al. |
| 4,830,794 A | 5/1989 | Edgley et al. |
| 4,840,729 A | 6/1989 | Levine |
| 4,850,430 A | 7/1989 | Copeland |
| 4,869,960 A | 9/1989 | Gibb et al. |
| 4,875,525 A | 10/1989 | Manna |
| 4,887,670 A | 12/1989 | Lord et al. |
| 4,888,240 A | 12/1989 | Graham et al. |
| 4,895,207 A * | 1/1990 | Friedman et al. ............ 166/276 |
| 4,921,820 A | 5/1990 | Rumpf et al. |
| 4,921,821 A | 5/1990 | Rumpf et al. |
| 4,923,714 A | 5/1990 | Gibb et al. |
| 4,969,523 A | 11/1990 | Martin et al. |
| 5,069,283 A | 12/1991 | Mack |
| 5,074,359 A | 12/1991 | Schmidt |
| 5,103,905 A | 4/1992 | Brannon et al. |
| 5,175,133 A | 12/1992 | Smith et al. |
| 5,240,654 A | 8/1993 | Smith et al. |
| 5,305,832 A | 4/1994 | Satyanarayana et al. |
| 5,330,005 A | 7/1994 | Card et al. |
| 5,333,689 A | 8/1994 | Jones et al. |
| 5,422,183 A | 6/1995 | Sinclair |
| 5,425,421 A | 6/1995 | Coleman et al. |
| 5,435,391 A | 6/1995 | Jones |
| 5,439,055 A | 8/1995 | Card et al. |
| 5,443,633 A | 8/1995 | Hirsbrunner et al. |
| 5,492,178 A | 2/1996 | Nguyen |
| 5,501,273 A | 3/1996 | Card et al. |
| 5,515,920 A | 5/1996 | Luk |
| 5,531,274 A | 7/1996 | Bienvenu, Jr. |
| 5,547,506 A | 8/1996 | Rae et al. |
| 5,582,249 A | 12/1996 | Caveny et al. |
| 5,582,250 A | 12/1996 | Constien |
| 5,597,784 A | 1/1997 | Sinclair et al. |
| 5,604,184 A | 2/1997 | Ellis et al. |
| 5,699,860 A | 12/1997 | Grundmann |
| 5,799,734 A | 9/1998 | Norman et al. |
| 5,837,656 A | 11/1998 | Sinclair |
| 5,908,073 A | 6/1999 | Nguyen et al. |
| 5,916,933 A | 6/1999 | Johnson et al. |
| 5,921,317 A | 7/1999 | Dewprashed et al. |
| 5,924,488 A | 7/1999 | Nguyen et al. |
| 5,948,734 A | 9/1999 | Sinclair |
| 5,950,727 A | 9/1999 | Irani |
| 5,955,144 A | 9/1999 | Sinclair et al. |
| 5,960,878 A | 10/1999 | Nguyen et al. |
| 5,964,289 A | 10/1999 | Hill |
| 5,964,291 A | 10/1999 | Bourne et al. |
| 6,047,772 A | 4/2000 | Weaver et al. |
| 6,059,034 A | 5/2000 | Rickards et al. |
| 6,070,666 A | 6/2000 | Montgomery |
| 6,079,492 A | 6/2000 | Hoogteerjling et al. |
| 6,114,410 A | 9/2000 | Betzold |
| 6,116,342 A | 9/2000 | Clark et al. |
| 6,138,760 A | 10/2000 | Lopez et al. |
| 6,169,058 B1 | 1/2001 | Le et al. |
| 6,172,011 B1 | 1/2001 | Card et al. |
| 6,194,355 B1 | 2/2001 | Jarrett et al. |
| 6,209,643 B1 | 4/2001 | Nguyen et al. |
| 6,211,120 B1 | 4/2001 | Welch et al. |
| 6,248,838 B1 | 6/2001 | Albright |
| 6,311,773 B1 | 11/2001 | Todd et al. |
| 6,315,041 B1 | 11/2001 | Carlisle |
| 6,328,105 B1 | 12/2001 | Betzold |
| 6,330,916 B1 | 12/2001 | Rickards et al. |
| 6,348,629 B1 | 2/2002 | Albright |
| 6,364,018 B1 | 4/2002 | Brannon et al. |
| 6,367,548 B1 | 4/2002 | Purvis et al. |
| 6,372,678 B1 | 4/2002 | Youngman et al. |
| 6,399,546 B1 | 6/2002 | Chang et al. |
| 6,406,789 B1 | 6/2002 | McDaniel et al. |
| 6,439,309 B1 | 8/2002 | Matherly et al. |
| 6,439,310 B1 | 8/2002 | Scott, III et al. |
| 6,451,953 B1 | 9/2002 | Albright |
| 6,491,099 B1 | 12/2002 | Di Lullo Arias et al. |
| 6,503,676 B2 | 1/2003 | Yamashita et al. |
| 6,508,305 B1 | 1/2003 | Brannon et al. |
| 6,528,157 B1 | 3/2003 | McDaniel et al. |
| 6,541,579 B2 | 4/2003 | Albright |
| 6,579,947 B2 | 6/2003 | Heitz et al. |
| 6,582,819 B2 | 6/2003 | McDaniel et al. |
| 6,632,527 B1 | 10/2003 | McDaniel |
| 6,640,897 B1 | 11/2003 | Misselbrook et al. |
| 6,667,261 B1 | 12/2003 | Anshits et al. |
| 6,705,400 B1 | 3/2004 | Nguyen et al. |
| 6,725,931 B2 | 4/2004 | Nguyen et al. |
| 6,742,590 B1 | 6/2004 | Nguyen |
| 6,749,025 B1 | 6/2004 | Brannon et al. |
| 6,766,817 B2 | 7/2004 | da Silva |
| 6,776,235 B1 | 7/2004 | England |
| 6,772,838 B2 | 8/2004 | Dawson et al. |
| 6,830,105 B2 | 12/2004 | Theising et al. |
| 6,892,813 B2 | 4/2005 | Nguyen et al. |
| 7,001,872 B2 | 2/2006 | Pyecroft et al. |
| 7,036,590 B2 | 5/2006 | Harris |
| 7,036,591 B2 | 5/2006 | Canan et al. |
| 7,036,597 B2 | 5/2006 | O'Brien et al. |
| 7,044,220 B2 | 5/2006 | Nguyen et al. |
| 7,066,258 B2 | 6/2006 | Justus et al. |
| 7,086,460 B2 | 7/2006 | Nguyen |
| 7,153,575 B2 | 12/2006 | Anderson et al. |
| 7,207,386 B2 | 4/2007 | Brannon et al. |
| 7,210,528 B1 | 5/2007 | Brannon et al. |
| 7,213,651 B2 | 5/2007 | Brannon et al. |
| 7,226,971 B2 | 6/2007 | Ramesh et al. |
| 7,270,879 B2 | 9/2007 | McCrary |
| 7,271,133 B2 | 9/2007 | Weaver et al. |
| 7,303,018 B2 | 12/2007 | Cawiezel et al. |
| 7,350,572 B2 | 4/2008 | Fredd et al. |
| 7,361,693 B2 | 4/2008 | Albright et al. |
| 7,426,961 B2 | 9/2008 | Stephenson et al. |
| 7,638,468 B2 | 12/2009 | Gupta |
| 7,726,399 B2 | 6/2010 | Brannon et al. |
| 7,913,762 B2 | 3/2011 | Wheeler et al. |
| 8,061,424 B2 | 11/2011 | Willberg et al. |
| 8,173,581 B2 | 5/2012 | Huang |
| 8,936,085 B2 | 1/2015 | Boney et al. |
| 2002/0023752 A1 | 2/2002 | Qu et al. |
| 2003/0050432 A1 | 3/2003 | Ramesh et al. |
| 2003/0224165 A1 | 12/2003 | Anderson et al. |
| 2004/0023812 A1 | 2/2004 | England et al. |
| 2004/0023818 A1 | 2/2004 | Nguyen et al. |
| 2004/0040708 A1 | 3/2004 | Stephenson et al. |
| 2004/0072700 A1 | 4/2004 | Gupta et al. |

(56) References Cited

U.S. PATENT DOCUMENTS

| | | |
|---|---|---|
| 2004/0224165 A1 | 12/2004 | Barron et al. |
| 2004/0244978 A1 | 12/2004 | Shaarpour |
| 2004/0261996 A1 | 12/2004 | Munoz et al. |
| 2005/0016732 A1 | 1/2005 | Brannon et al. |
| 2005/0028976 A1 | 2/2005 | Nguyen et al. |
| 2005/0028979 A1 | 2/2005 | Brannon et al. |
| 2005/0059558 A1 | 3/2005 | Blauch et al. |
| 2005/0089631 A1 | 4/2005 | Nguyen |
| 2005/0130848 A1 | 6/2005 | Todd et al. |
| 2005/0244641 A1 | 11/2005 | Vincent |
| 2005/0272612 A1 | 12/2005 | Dawson et al. |
| 2005/0274523 A1 | 12/2005 | Wood et al. |
| 2006/0073980 A1 | 4/2006 | Brannon et al. |
| 2006/0185848 A1 | 8/2006 | Surjaatmadja et al. |
| 2008/0139416 A1 | 6/2008 | Rimassa et al. |
| 2008/0179057 A1* | 7/2008 | Dawson ............... C09K 8/805 166/280.2 |
| 2010/0200235 A1 | 8/2010 | Luo et al. |
| 2010/0263866 A1 | 10/2010 | Huang et al. |
| 2011/0180259 A1 | 7/2011 | Willberg et al. |
| 2012/0024530 A1 | 2/2012 | Todd et al. |
| 2012/0073809 A1 | 3/2012 | Clum et al. |
| 2012/0085536 A1 | 4/2012 | Alboudwarej et al. |
| 2012/0267102 A1 | 10/2012 | Huang et al. |
| 2012/0285692 A1* | 11/2012 | Potapenko ............ E21B 21/003 166/308.1 |
| 2013/0168096 A1 | 7/2013 | Parkhonyuk et al. |
| 2014/0178325 A1 | 6/2014 | Martinez-Castro et al. |
| 2015/0129214 A1 | 5/2015 | Boney et al. |

FOREIGN PATENT DOCUMENTS

| | | |
|---|---|---|
| EP | 0773343 A2 | 5/1997 |
| EP | 1023382 81 | 8/2006 |
| GB | 2319796 B | 3/1998 |
| WO | 0166908 A2 | 9/2001 |
| WO | 02/26656 A1 | 4/2002 |
| WO | 2004083600 A1 | 9/2004 |
| WO | 2011018257 A1 | 2/2011 |

OTHER PUBLICATIONS

Dave Allison; "Accessfrac Service Diversion Technology"; HO9034; Jan. 30, 2011; 45 pages; Haliburton Energy Services.

Halliburton; "AccessFrac Stimulation Service: Enhanced Proppant Distribution Provides Improved Access to Complex Fracture Networks in Shale Formations"; H08720; Nov. 2011; 2 pages; Haliburton Production Enhancement.

Wood, et al.; Ultra-Lightweight Proppant Development Yields Exciting New Opportunities in Hydraulic Fracturing Design; SPE 84309: Society of Petroleum Engineers, Inc ; 2003.

Gupta et al, The Historyand Success of Liquid CO2 and CO2/N2 Fracturing System; SPE 40016, Society of Petroleum Engineers, Inc.; 1998.

Savari et al, "Improved Lost Circulation Treatment Design and Testing Techniques Minimize Formation Damage", SPE 143603, Jun. 7, 2011-Jun. 10, 2011, The Netherlands, pp. 1-8.

* cited by examiner

METHOD OF USING PHTHALIC AND TEREPHTHALIC ACIDS AND DERIVATIVES THEREOF IN WELL TREATMENT OPERATIONS

This application claims the benefit of U.S. patent application Ser. No. 61/664,640, filed on Jun. 26, 2012.

FIELD OF THE DISCLOSURE

The disclosure relates to methods of using phthalic acid, terephthalic acid and derivatives thereof in well treatment operations. Such compounds are particularly effective in re-directing well treatment fluids from high permeability zones of a subterranean formation to low permeability zones.

BACKGROUND OF THE DISCLOSURE

The success of well treatment operations often depends on optimizing placement of fluids downhole. This is especially the case for fluids used in acid stimulation, hydraulic fracturing, sand control, well clean-out and well completion operations. It further is true for treatment operations which employ fluid loss pills.

In the past, much interest has focused on methods for improving downhole placement of well treatment fluids used in acid stimulation and hydraulic fracturing operations. Acid simulation of a hydrocarbon formation, such as by matrix acidizing, enhances the production of hydrocarbons within the formation. In this procedure, acid or an acid-forming material is injected into the formation and the acid reacts with minerals in the formation. As a result, near-wellbore permeability is improved by the opening of channels or wormholes within the formation. In addition to dissolving formation materials, the acid may remove blockages caused by natural or man-made conditions. The procedure is especially prevalent in the treatment of carbonate formations since the reaction products are soluble in the spent acid.

Early attempts at optimizing the placement of acid downhole focused on injection of a simple acidic solution into the wellbore. Such attempts proved to be inefficient as the fluid often reacted or was spent too quickly. Such treatment fluids were therefore incapable of penetrating deep into the formation, thereby limiting their effectiveness to very near-wellbore applications. Thus, where the treated subterranean formation contained sections with varying permeability, the injected acid typically acidized the zone within the formation which had the highest permeability and the highest degree of water saturation. A permeability contrast between areas of high permeability (treated areas) within the formation and areas of low permeability (untreated areas) resulted.

It is necessary that acid placement downhole be optimized in order to provide uniform distribution of treatment fluid over the zone being treated. Chemical, as well as mechanical, methods have been developed in order to divert the flow of treatment fluids from the higher permeability and/or water saturated sections of the formation to the lower permeability or oil bearing sections. The difference between chemical and mechanical diversion is that chemical diverting agents achieve diversion by increasing flow resistance inside the created channels, whereas mechanical diversion controls the fluid entry point at the wellbore. Hence chemical diverting agents are often considered to be internal diverting agents compared to external mechanical diversion.

In the past, chemical diversion has been achieved by the use of viscous fluids, foams and gels which reportedly improve acid placement. Though several chemical diverters have emerged over the years, they have each failed to precisely control the flow of the acidizing fluid. One such alternative, disclosed in U.S. Pat. No. 7,060,661 is drawn to the use of a single surfactant system as a gelled acidizing fluid wherein the surfactant gels an acid fluid containing between 3 to 15% HCl solution by volume. Extra energy is often required to pump this already viscous gelled fluid into the well.

Further, N,N,-bis (2-hydroxyethyl) tallow ammonium acetate has been proposed as a gelling agent though the compound exhibits breakdown at higher temperatures as the acid is spent. In addition, since the compound gels too quickly, it is unable to fully penetrate into the formation. In addition, the maximum viscosity of the gelling agent is too low to adequately perform the necessary diverting.

Other proposed alternatives employ crosslinked systems wherein a gel is produced from a polymerization reaction while the fluid is pumped into the formation. A residue is often left in the formation which causes damage to the formation. Such systems are further dependent upon a sensitive chemical reaction since it is desirable that polymerization be delayed during pumping and maximized once the fluid is within the formation. Further, breakers for defragmenting the crosslinked polymer are typically needed to remove such systems from the well.

Other attempts at creating a gelled acidizing fluid have used a multi-surfactant based system. An example of this type of system was described in U.S. Pat. No. 6,399,546. These systems are often undesirable because they require mixing of two or more compounds at the well site. In addition, the ratio of the components is often dependent on the temperature and the pH of the system. Further, gelling of the system often requires introduction of a chemical trigger.

More recently, improvements have been seen with in-situ gelled acids. For instance, U.S. Pat. No. 7,303,018 discloses a gelled or thickened viscoelastic foam or fluid generated from (i.) an amidoamine oxide gelling agent and (ii.) an acid, water and/or brine, optionally mixed with a gas to form a foam. In-situ gelled acids offer the benefit of increased viscosity inside the formation. Thus, when acid first enters the high permeability zone and generates wormholes, its viscosity becomes higher than the acid still in the wellbore. This provides extra resistance in the already treated high permeability region or in the wormholes and increases the likelihood that the acid will enter the low permeability untreated zones of the formation.

Oil-soluble naphthalenes, crushed limestone, sodium tetraborate, oyster shells, gilsonite, perilite and paraformaldehyde have also been reported for use as chemical diverters. Such materials have been shown to be only useful in reservoirs having a bottom hole temperature of 175° F. or less. Interest in these compounds has been replaced by rock salt, which is partially soluble in the acid, inexpensive and easier to handle.

In addition to rock salt, diversion techniques have also focused on materials which are completely acid soluble. For instance, wax-polymer blends and hydrocarbon resins have been used in production wells and benzoic acid in water-injection wells. Most oil-soluble resins are not useful, however, for acidizing in carbonates because such resins are unable to bridge the large flow spaces created by the reaction of the injected acid with the reservoir rock. Recently, solid organic acid flakes, such as lactic acid flakes, have been reported to be useful for acid diversion. Such materials can only be used in wells with bottom hole temperatures below 250° F. In addition, while such materials hydrolyze to release acid, a high volume of water is required to completely hydrolyze the material and to ensure full conversion of the solid materials into acid. Failure to remove the solids causes formation damage.

A need exists therefore for a chemical diverter that does not rely upon crosslinking for gelation and which exhibits high viscosity. Such diverters need to adequately divert incoming fluids and yet allow maximum penetration. In particular, the diverter should be capable of being useful at bottom hole temperatures in excess of 175° F. and in most cases in excess of 250° F.

It further would be helpful for the diverting agent to have applications in other well treatment operations such as in hydraulic fracturing, sand control, well clean-out and well completion operations.

SUMMARY OF THE DISCLOSURE

This disclosure relates to a method of re-directing a well treatment fluid to targeted zones of a subterranean formation by diverting the fluid away from high permeability or undamaged zones of the formation by temporarily blocking the high permeability zones.

In an embodiment, a well treatment fluid is diverted from a high permeability or undamaged zone of a formation by introducing into the wellbore particulates having the structural formula (I):

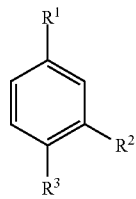

(I)

or an anhydride thereof
wherein:
$R^1$ is —COO—$(R^5O)_y$—$R^4$;
$R^2$ and $R^3$ are selected from the group consisting of —H and —COO—$(R^5O)_y$—$R^4$;
 provided that at least one of $R^2$ or $R^3$ is —COO—$(R^5O)_y$—$R^4$ and
 further provided that both $R^2$ and $R^3$ are not —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

In an embodiment, particulates having the structural formula (I) form bridging solids on the face of the subterranean formation which diverts the flow of treatment fluid away from the high permeability zone of the formation.

In another embodiment, particulates having the structural formula (I) form a relatively low-permeability filter cake on the face of the subterranean formation. The pressure drop through the filter cake increases the flow resistance of well treatment fluid through the formation and diverts the treatment fluid to other parts of the formation.

In an embodiment, an acidizing fluid is diverted away from a high permeability zone to a lower permeability zone of a formation by introducing into the formation particulates having structural formula (I).

In another embodiment, a hydraulic fracturing fluid is diverted away from a high permeability zone to a lower permeability zone of a formation by introducing into the formation particulates having structural formula (I).

In another embodiment, particulates of formula (I) may be used in a fluid loss pill to control leak-off of treatment fluids to the formation.

In another embodiment, the particulates of formula (I) may be used in a wellbore completion fluid to enable formation of a filter cake over the surface of the wellbore.

In another embodiment, particulates of formula (I) may be used as a clean-out fluid.

In another embodiment, particulates of formula (I) may be used to form a permeable pack during a sand control operation, such as gravel packing.

DETAILED DESCRIPTION OF THE PREFERRED EMBODIMENTS

Well treatment fluids for use in the methods described herein contain particulates having the structural formula (I):

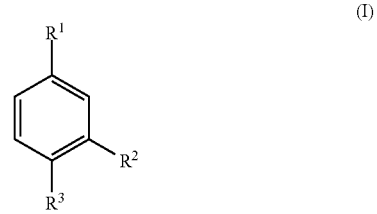

(I)

wherein:
$R^1$ is —COO—$(R^5O)_y$—$R^4$;
$R^2$ and $R^3$ are selected from the group consisting of —H and —COO—$(R^5O)_y$—$R^4$;
 provided that at least one of $R^2$ or $R^3$ is —COO—$(R^5O)_y$—$R^4$ and
 further provided that both $R^2$ and $R^3$ are not —COO—$(R^5O)_y$—$R^4$;
$R^4$ is —H or a $C_1$-$C_6$ alkyl group;
$R^5$ is a $C_1$-$C_6$ alkylene group; and
each y is 0 to 5.

Alternatively, the particulates may be an anhydride of the compound of structural formula (I).

In a preferred embodiment, $R^2$ of the compound of formula (I) is —H and $R^3$ is —COO—$(R^5O)_y$—$R^4$. In an especially preferred embodiment, the compound of formula (I) is phthalic acid (wherein y is 0 and $R^4$ is —H). In another preferred embodiment, the compound of formula (I) is phthalic acid anhydride.

Still in another preferred embodiment, $R^2$ of the compound of formula (I) is —COO—$(R^5O)_y$—$R^4$ and $R^3$ is —H. In an especially preferred embodiment, the compound of formula (I) is terephthalic acid (wherein y is 0 and $R^4$ is —H). In another preferred embodiment, the compound of formula (I) is terephthalic acid anhydride.

The particulates may be of any size or shape. For instance, the particulates may be substantially spherical, such as being beaded, or pelleted. Further, the particulates may be non-beaded and non-spherical such as an elongated, tapered, egg, tear-drop or oval shape or mixtures thereof. For instance, the particulates may have a shape that is cubic, bar-shaped (as in a hexahedron with a length greater than its width, and a width greater than its thickness), cylindrical, multi-faceted, irregular, or mixtures thereof. In addition, the particulates may have a surface that is substantially roughened or irregular in nature or a surface that is substantially smooth in nature. Moreover, mixtures or blends of particulates having differing, but suitable, shapes for use in the disclosed method further be employed.

The amount of particulates of formula (I) in the treatment fluid may be from about 0.01 to about 30 volume percent (based on the total volume of the fluid).

The particulates are particularly effective when placed into wells having bottom hole temperatures between from about 175° F. to about 250° F. The particulates may be partially, but not fully, dissolved at in-situ reservoir conditions. Typically, the particulates are fully dissolved over time. In most instances, the particulates are fully dissolved subsequent to completion of the well treatment operation.

The fluid phase of the treatment fluid containing the particulates is any fluid suitable for transporting the particulate into a well and/or subterranean formation such as water, salt brine and slickwater. Suitable brines including those containing potassium chloride, sodium chloride, cesium chloride, ammonium chloride, calcium chloride, magnesium chloride, sodium bromide, potassium bromide, cesium bromide, calcium bromide, zinc bromide, sodium formate, potassium formate, cesium formate, sodium acetate, and mixtures thereof. The percentage of salt in the water preferably ranges from about 0% to about 60% by weight, based upon the weight of the water.

The fluid of the treatment fluid may be foamed with a liquid hydrocarbon or a gas or liquefied gas such as nitrogen or carbon dioxide.

In addition, the fluid may further be foamed by inclusion of a non-gaseous foaming agent. The non-gaseous foaming agent may be amphoteric, cationic or anionic. Suitable amphoteric foaming agents include alkyl betaines, alkyl sultaines and alkyl carboxylates, such as those disclosed in U.S. Patent Publication No. 2010/0204069, herein incorporated by reference. Suitable anionic foaming agents include alkyl ether sulfates, ethoxylated ether sulfates, phosphate esters, alkyl ether phosphates, ethoxylated alcohol phosphate esters, alkyl sulfates and alpha olefin sulfonates. Suitable cationic foaming agents include alkyl quaternary ammonium salts, alkyl benzyl quaternary ammonium salts and alkyl amido amine quaternary ammonium salts.

The pH of the fluid containing the particulates may further be adjusted when desired. When adjusted, it typically has a value of about 6.5 or more, 7 or more, 8 or more, 9 or more, between 9 and 14, and, most preferably, between 7.5 and 9.5. The pH may be adjusted by any means known in the art, including adding acid or base to the fluid, or bubbling carbon dioxide through the fluid.

The fluid may be gelled or non-gelled. Typically the fluid is gelled by the inclusion of a viscosifying agent such as a viscosifying polymer or viscoelastic fluid. The fluid may contain a crosslinking agent though a crosslinking agent is not required. Generally, the viscosity of the fluid is greater than or equal to 10 cP at room temperature.

In a preferred embodiment, particulates of formula (I) are used as a diverter in the stimulation of a subterranean formation penetrated by a well where it may be introduced into productive zones of a formation having various permeabilities. The particulates are capable of diverting a well treatment fluid from a high permeability zone to a low permeability zone of a subterranean formation. Since conductivity is permeability multiplied by injection geometry, this is synonymous to the statement that the particulates are capable of diverting a well treatment fluid from a highly conductive primary fracture(s) to less conductive secondary fractures. Further, since conductivity is a function of the relative resistance to inflow, the reference to a conductive fracture as used herein is considered synonymous to a conductive reservoir area.

The solid particulates typically bridge the flow spaces on the face of the formation and form a filter cake. For instance, when employed in acid fracturing, the particulates are of sufficient size to bridge the flow space (created from the reaction of the injected acid with the reservoir rock) without penetration of the matrix. By being filtered at the face of the formation, a relatively impermeable or low permeability filter cake is created on the face of the formation. The pressure drop though the filter cake increases the flow resistance and diverts treatment fluid to less permeable zones of the formation.

The size distribution of the particulates of formula (I) should be sufficient to block the penetration of the fluid into the high permeability zone of the formation. The filter cake is more easily formed when at least 60%, more preferably 80%, of the particulates of formula (I) within the well treatment fluid have a particle size between from about 150 μm to about 2000 μm.

When used in stimulation operations, the particle size of the particulates is such that the particulates may form a bridge on the face of the rock. Alternatively, the particle size of the particulates may be such that they are capable of flowing into the fracture and thereby pack the fracture in order to reduce the permeability of at least some of the fractures in the formation.

Where the particulates are components of an acidizing solution, the amount of aqueous acid in the fluid may range from about 70 to about 99 volume percent and the strength of the acid may be greater than or equal to 10%. The acid reacting, with the rock, lowers the acid strength to a concentration less than 15%.

When used as a diverter, the fluid containing the particulates may be pumped directly to the high permeability zone of the well formation. The majority of the diverting fluid will enter into the high permeability or non-damaged zone and form a temporary "plug" or "viscous pill" while the lower permeability zone has little invasion. This temporary "viscous pill" causes a pressure increase and diverts the fluid to a lower permeability portion of the formation. The particulates are capable of being spread deeper into subterranean formations than diverting agents of the prior art.

Once in place, the viscous pill formed from the diverter will have a finite depth of invasion which is related to the pore throat diameter. For a given formation type, the invasion depth is directly proportional to the nominal pore throat diameter of the formation. Since varying depths of invasion occur throughout the formation based upon the varying permeability or damage throughout the treated zone, the ability of the treatment fluid to invade into pore throats is dependent on the difference between pore throat sizing of the damaged and non-damaged formation. Invasion depths will normally be greater in the cleaner or non-damaged portion of the formation (larger pore throats) than in the lower permeability or damaged zones (smaller or partially filled pore throats). With a greater depth of invasion in the cleaner sections of the formation, more of the diverter may be placed in these intervals.

In another preferred embodiment, the particulates are used as a fluid loss pill in the control of leak-off of the treatment fluid to the formation. The fluid loss pill is a specific fluid that is injected into the well and designed to alleviate the fluid loss, particularly from completion fluids, into the formation. In specific situations, such as during perforation of the well casing, it is considered particularly advantageous to incorporate a fluid loss pill in addition to the normal fluid loss control additives typically included in the wellbore treatment fluids. The operator may control leak-off of the treatment fluid to the formation by controlling the size differential between the particulates and the pore throats. Solid particulates of formula (I) are deposited on the formation wall and form a substantially impermeable filter cake.

Particulates of formula (I) may further be used in completion fluids. Completion fluids are utilized when conducting various completion operations in the producing formations. Such particulates seal off the face of the wellbore so that the fluid is not lost to the formation. The particulates are deposited and form a filter cake of the solids in the fluid over the surface of the wellbore without any loss of solids to the formation. As such, the particulates form a fluid bridge over the formation pores rather than permanently plugging the pores.

Fluids containing the particulates may also be useful as a sand control fluid. In one exemplary embodiment, a gravel pack operation may be carried out on a wellbore that penetrates a subterranean formation to prevent or substantially reduce the production of formation particles into the wellbore from the formation during production of formation fluids. A screen assembly such as is known in the art may be placed or otherwise disposed within the wellbore so that at least a portion of the screen assembly is disposed adjacent the subterranean formation. A slurry including particulates of formula (I) and a treatment fluid for carrying the particulates may then be introduced into the wellbore and placed adjacent the subterranean formation by circulation or other suitable method so as to form a fluid-permeable pack in an annular area between the exterior of the screen and the interior of the wellbore. This permeable pack is capable of reducing or substantially preventing the passage of formation particles from the subterranean formation into the wellbore during production of fluids from the formation, while at the same time allowing passage of formation fluids from the subterranean formation through the screen into the wellbore.

The particulates described herein may further be used in well intervention applications, such as wellbore clean-out wherein solid debris, especially hydrophobic materials, are removed from the wellbore in order to ensure unobstructed hydrocarbon recovery. For instance, fluid containing particulates of formula (I) may be introduced into the wellbore, such as by coiled tubing, to remove hydrophobic particulate materials remaining in the wellbore. In an embodiment, the particulates may agglomerate the hydrophobic particulate material and the agglomerate may then be removed or carried upward to the surface. Clean-out may also occur the well is drilled and prior to stimulation. The use of the particulates in such clean-out operations cuttings are removed that could adversely affect the subsequent injection of fracturing fluid.

While the particulates are most typically a component of the treatment fluid (i.e., acidizing fluid, hydraulic fracturing fluid, wellbore completion fluid, etc.), a fluid containing particulates of formula (I) in may be pumped into the wellbore followed by or prior to the addition of the well treatment fluid (i.e., acidizing fluid, hydraulic fracturing fluid, wellbore completion fluid, etc.).

For instance, when used in hydraulic fracturing, the particulates perform as a diverter and may be a component of the hydraulic fracturing fluid or may be pumped into the formation as a component of a pad fluid. Further, in an acid fracturing operation, a stage of acid may preferably be injected following introduction of a fluid containing the diverter.

Further, a fluid containing the particulates of formula (I) may be pumped into the wellbore in alternative stages and may be separate by spacer fluids. The spacer fluid typically contains a salt solution such as NaCl, KCl and/or $NH_4Cl$. For instance, the loss in viscosity of a fluid loss pill may require additional diverter stages to be pumped. In addition, alternate stages may be required to more appropriately treat a heterogeneous formation. For instance, when used in an acid stimulation operation, it may be desirable to alternate the pumping of acid stimulation fluids and diverting fluids. An exemplary pumping schedule may be (i) pumping an acid stimulation fluid; (ii) optionally pumping a spacer fluid; (iii) pumping a fluid containing the diverter; (iv) optionally pumping a spacer fluid; and then repeating the cycle of steps (i), (ii), (iii) and (iv).

The fluid containing the particulates may further contain additional well treatment fluid additives. These include one or more conventional additives to the well service industry such as a gelling agent, fluid loss additives, gel breaker, surfactant, demulsifier, biocide, mutual solvent, surface tension reducing agent, defoaming agent, demulsifier, non-emulsifier, scale inhibitor, gas hydrate inhibitor, enzyme breaker, oxidative breaker, buffer, clay stabilizer, acid, buffer, solvent or a mixture thereof.

Where the fluid containing the particulates is an acidizing fluid, it may be preferable to include within the fluid a corrosion inhibitor, a corrosion inhibitor intensifier, or a combination thereof. The purpose of these additives is to reduce the corrosive effects that the acids may have on the well tubulars. Suitable corrosion inhibitors can include alkali metal nitrites, nitrates, phosphates, silicates and benzoates. Representative suitable organic inhibitors include hydrocarbyl amine and hydroxy-substituted hydrocarbyl amine neutralized acid compound, such as neutralized phosphates and hydrocarbyl phosphate esters, neutralized fatty acids (e.g., those having 8 to about 22 carbon atoms), neutralized carboxylic acids (e.g., 4-(t-butyl)-benzoic acid and formic acid), neutralized naphthenic acids and neutralized hydrocarbyl sulfonates. Mixed salt esters of alkylated succinimides are also useful. Corrosion inhibitors can also include the alkanolamines such as ethanolamine, diethanolamine, triethanolamine and the corresponding propanolamines as well as morpholine, ethylenediamine, N,N-diethylethanolamine, alpha- and gamma-picoline, piperazine and isopropylaminoethanol.

Fluids containing particulates of formula (I) may also have an internal breaker built into the system to insure that the fluid viscosity can be reduced after a period of time. The internal breaker may also be an oxidizer such as, but not limited to, persulfates, such as ammonia persulfate and sodium persulfate, and peroxidizers such as hydrogen peroxide.

The formation subjected to the treatment of the disclosure may be a hydrocarbon or a non-hydrocarbon subterranean formation. The high permeability zone of the formation into which the fluid containing the diverter is pumped may be natural fractures. When used with low viscosity fracturing fluids, the particulates of formula (I) are capable of diverting fracturing fluids to extend fractures and increase the stimulated surface area.

The disclosure has particular applicability to the stimulation of carbonate formations, such as limestone, chalk or dolomite as well as subterranean sandstone or siliceous formations in oil and gas wells, including quartz, clay, shale, silt, chert, zeolite, or a combination thereof.

In another preferred embodiment, the diverter is introduced into coal beds having a series of natural fractures, or cleats, for the recovery of natural gases, such as methane, and/or sequestering a fluid which is more strongly adsorbing than methane, such as carbon dioxide and/or hydrogen sulfide.

From the foregoing, it will be observed that numerous variations and modifications may be effected without departing from the true spirit and scope of the novel concepts of the disclosure.

What is claimed is:

1. A method of stimulating a subterranean formation penetrated by a well with a diverting agent, the method comprising:
   (A) introducing into the well a fluid comprising particulates of a compound of formula (I):

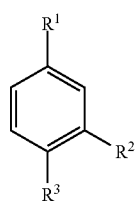

(I)

or an anhydride thereof
wherein:
$R^1$ is —COO—$(R^5O)_y$—$R^4$;
$R^2$ and $R^3$ are selected from the group consisting of —H and —COO—$(R^5O)_y$—$R^4$;
provided that at least one of $R^2$ or $R^3$ is —COO—$(R^5O)_y$—$R^4$ and further provided that both $R^2$ and $R^3$ are not —COO—$(R^5O)_y$—$R^4$;
$R^4$ is —H or a $C_1$-$C_6$ alkyl group;
$R^5$ is a $C_1$-$C_6$ alkylene group; and
each y is 0 to 5
the particulates having a sized distribution to form bridging solids on the face of a high permeability zone of the formation and block the penetration of the fluid into the high permeability zone of the formation;
   (B) forming a filter cake of the particulates on the face of the high permeability zone and increasing resistance to flow of the well treatment fluid through the high permeability zone by a pressure drop through the filter cake; and
   (C) diverting the flow of the fluid to a low permeability portion of the formation.

2. The method of claim 1, wherein $R^2$ is —H and $R^3$ is —COO—$(R^5O)_y$-$R^4$.

3. The method of claim 2, wherein y is 0 and $R^4$ is —H.

4. The method of claim 2, wherein $R^2$ is —COO—$(R^5O)_y$-$R^4$ and $R^3$ is —H.

5. The method of claim 4, wherein y is 0 and $R^4$ is —H.

6. The method of claim 1, wherein the compound is phthalic anhydride.

7. The method of claim 1, wherein the compound is terephthalic anhydride.

8. The method of claim 1, wherein the compound is phthalic acid.

9. The method of claim 1, wherein the compound is terephthalic acid.

10. The method of claim 1, wherein the fluid is an acidizing fluid having from about 70 to about 99 volume percent of aqueous acid and further wherein the strength of the acid is greater than or equal to 10%.

11. The method of claim 1, wherein the fluid is a wellbore completion fluid or a fluid loss pill.

12. The method of claim 1, wherein the high permeability zone has natural fractures.

13. The method of claim 1, wherein the subterranean formation is sandstone or carbonate.

14. The method of claim 1, wherein the amount of compound of formula (I) in the fluid is from about 0.01 to about 30 volume percent.

15. The method of claim 1, wherein the compound of formula (I) is fully dissolvable at in-situ downhole conditions.

16. The method of claim 1, wherein at least 60% of the particulates of formula (I) in the fluid have a particle size between from about 150 μm to about 2000 μm.

* * * * *